United States Patent
Jiang et al.

(10) Patent No.: US 11,280,899 B2
(45) Date of Patent: Mar. 22, 2022

(54) TARGET RECOGNITION FROM SAR DATA USING RANGE PROFILES AND A LONG SHORT-TERM MEMORY (LSTM) NETWORK

(71) Applicant: THE BOEING COMPANY, Chicago, IL (US)

(72) Inventors: Qin Jiang, Oak Park, CA (US); David Payton, Calabasas, CA (US); Adour Vahe Kabakian, Monterey Park, CA (US); Joshua Haug, Sierra Madre, CA (US); Brian N. Limketkai, Santa Monica, CA (US)

(73) Assignee: THE BOEING COMPANY, Chicago, IL (US)

( * ) Notice: Subject to any disclaimer, the term of this patent is extended or adjusted under 35 U.S.C. 154(b) by 218 days.

(21) Appl. No.: 16/804,978

(22) Filed: Feb. 28, 2020

(65) Prior Publication Data
US 2021/0270959 A1  Sep. 2, 2021

(51) Int. Cl.
*G01S 13/90* (2006.01)
*G01S 13/933* (2020.01)
*G01S 13/00* (2006.01)

(52) U.S. Cl.
CPC ........ *G01S 13/9027* (2019.05); *G01S 13/933* (2020.01)

(58) Field of Classification Search
CPC .... G01S 13/9027; G01S 13/933; G01S 7/411; G01S 7/412; G01S 13/904; G01S 13/9029; G06K 9/00711; G06N 3/08; G06N 3/084
See application file for complete search history.

(56) References Cited

U.S. PATENT DOCUMENTS

| 6,337,654 B1 * | 1/2002 | Richardson ............. G01S 7/412 342/90 |
| 6,943,724 B1 * | 9/2005 | Brace .................. G01S 13/9029 342/25 B |
| 7,289,060 B1 * | 10/2007 | Abatzoglou ............ G01S 7/412 342/175 |

(Continued)

OTHER PUBLICATIONS

E. Kouba et al, "Recurrent neural networks for radar target identification"; published in Proceedings of the SPIE; vol. 1965; pp. 256-266; published on Sep. 2, 1993, by SPIE, Bellingham, WA, USA. (Year: 1993).*

*Primary Examiner* — Bernarr E Gregory
(74) *Attorney, Agent, or Firm* — Womble Bond Dickinson (US) LLP (57) ABSTRACT

A method of identifying a target from synthetic aperture radar (SAR) data without incurring the computational load associated with generating an SAR image. The method includes receiving SAR data collected by a radar system including RF phase history data associated with reflected RF pulses from a target in a scene, but excluding an SAR image. Range profile data is determined from the SAR data by converting the RF phase history data into a structured temporal array that can be applied as input to a classifier incorporating a recurrent neural network, such as a recurrent neural network made up of long short-term memory (LSTM) cells that are configured to recognize temporal or spatial characteristics associated with a target, and provide an identification of a target based on the recognized temporal or spatial characteristic.

20 Claims, 7 Drawing Sheets

(56) References Cited

U.S. PATENT DOCUMENTS

| | | | |
|---|---|---|---|
| 8,948,501 B1* | 2/2015 | Kim | G06K 9/00711 |
| | | | 382/159 |
| 10,732,261 B1* | 8/2020 | Wang | G06N 3/084 |
| 10,867,210 B2* | 12/2020 | Mao | G06N 3/08 |
| 10,976,429 B1* | 4/2021 | Jiang | G01S 13/9027 |
| 11,150,327 B1* | 10/2021 | Jiang | G01S 13/904 |
| 2010/0052977 A1* | 3/2010 | Sathyendra | G01S 7/411 |
| | | | 342/25 F |
| 2012/0286989 A1* | 11/2012 | Sathyendra | G01S 7/412 |
| | | | 342/25 F |
| 2016/0019458 A1* | 1/2016 | Kaufhold | G01S 13/9029 |
| | | | 342/25 F |
| 2021/0109209 A1* | 4/2021 | Li | G01S 13/9027 |
| 2021/0215818 A1* | 7/2021 | Kim | G01S 13/9029 |

* cited by examiner

TARGET RECOGNITION FROM SAR DATA USING RANGE PROFILES AND A LONG SHORT-TERM MEMORY (LSTM) NETWORK

TECHNOLOGICAL FIELD

The subject disclosure relates generally to the detection of objects with radar, and in particular, the use of a recurrent neural network to rapidly and efficiently analyze received radio frequency (RE) pulses to accurately identify objects reflecting RE pulses.

BACKGROUND

The real-time or near real-time recognition of a target or other object in a scene captured by synthetic aperture radar (SAR) is an important capability in many situations and contexts. Conventional approaches to target detection in an SAR environment require that the raw SAR data (typically in the form of RF phase history data) be converted into one or more SAR images to enable the recognition of a target. The processes used convert raw SAR data into SAR images are computationally intensive to a degree that real-time computation (and thus real-time target recognition) is not possible in many applications and contexts. Additional technical challenges often arise in situations where the computational resources necessary to generate SAR images cannot be co-located with the system capturing the SAR data. In such situations, such as when the SAR data is captured by a drone or in-flight vehicle for example, the delay associated with transmitting or otherwise delivering the captured SAR data to a system capable of generating one or more SAR images and identifying a target or other object therein further impedes the ability to recognize a target or other object in real-time or near real-time.

BRIEF SUMMARY

Example implementations of the subject disclosure are directed to the detection of objects with radar, and in particular, the use of a recurrent neural network to rapidly and efficiently analyze received radio frequency (RE) pulses to accurately identify objects reflecting RE pulses in a given area. Example implementations provide for the rapid and efficient detection of a target within received SAR data without requiring the generation of an SAR image. Example implementations may overcome the delays and other technical challenges associated with conventional approaches to target identification in SAR contexts by receiving SAR data collected by a radar system where the SAR data does not include an SAR image, and converting and structuring the received SAR data to determine range profile data. The range profile data can then be applied to a classifier with a recurrent neural network, including but not limited to a network comprising one or more long short-term memory (LSTM) cells that is configured to recognize a temporal or spatial characteristic associated with a target. Upon recognizing a temporal or spatial characteristic associated with a target, an identification of the target can be automatically provided to a user.

In some example implementations, the computational efficiency achieved may be such that the components used to implement the classifier may be co-located with the radar system, further reducing the delays and other technical challenges that arise when the SAR data must be transmitted away from the radar system in order to perform conventional target recognition operations.

The subject disclosure thus includes, without limitation, the following example implementations.

Some example implementations provide a method for identifying a target comprising receiving synthetic aperture radar (SAR) data collected by a radar system, wherein the SAR data comprises radio frequency (RF) phase history data associated with reflected RF pulses from at least one object in a scene, and wherein the SAR data excludes an SAR image; determining range profile data from the SAR data by converting the RF phase history data associated with the reflected RF pulses into a temporal array structured to represent detected ranges of the at least one object at a plurality of time steps; applying the range profile data to a classifier comprising a recurrent neural network configured to recognize, within the range profile data, a temporal characteristic or a spatial characteristic associated with a target; and providing an identification of a target associated with the temporal characteristic or the spatial characteristic.

In some example implementations of the method of any preceding example implementation, or any combination of any preceding example implementations, applying the range profile data to the classifier comprises extracting segments from the range profile data, wherein each segment comprises a portion of the range profile data at a sequential subset of the plurality of time steps and providing each segment serially as input to the classifier, wherein the classifier is further configured to recognize, within each segment, the temporal characteristic or the spatial characteristic associated with the target.

In some example implementations of the method of any preceding example implementation, or any combination of any preceding example implementations, the sequential subset of the plurality of time steps for each of the segments is non-overlapping with any other sequential subset of the plurality of time steps.

In some example implementations of the method of any preceding example implementation, or any combination of any preceding example implementations, the sequential subset of the plurality of time steps for a first of the segments includes a time step that is included in the sequential subset of the plurality of time steps of a second segment.

In some example implementations of the method of any preceding example implementation, or any combination of any preceding example implementations, converting the RF phase history data associated with the reflected RP pulses into the temporal array comprises applying a one-dimensional fast Fourier transform to the RF pulses in the RF phase history data to generate a two-dimensional range-profile array.

In some example implementations of the method of any preceding example implementation, or any combination of any preceding example implementations, the recurrent neural network comprises long short-term memory (LSTM) cells configured to identify a spatial-temporal correlation pattern within the range profile sequence segments.

In some example implementations of the method of any preceding example implementation, or any combination of any preceding example implementations, the radar system and classifier are co-located on a vehicle.

Some example implementations provide an apparatus for detecting a target is provided, the apparatus comprising a processor and a memory storing executable instructions that, in response to execution by the processor, cause the apparatus to at least perform the method of any preceding example implementation, or any combination of any preceding example implementations.

Some example implementations provide a computer-readable storage medium for detecting a target is provided, the computer-readable storage medium being non-transitory and having computer-readable program code portions stored therein that in response to execution by a processor, cause an apparatus to at least perform the method of any preceding example implementation, or any combination of any preceding example implementations.

These and other features, aspects, and advantages of the subject disclosure will be apparent from a reading of the following detailed description together with the accompanying figures, which are briefly described below. The subject disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURES

Having thus described example implementations of the disclosure in general terms, reference will now be made to the accompanying figures, which are not necessarily drawn to scale, and wherein:

DETAILED DESCRIPTION

Some implementations of the subject disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless specified otherwise or clear from context, references to first, second or the like should not be construed to imply a particular order. A feature may be described as being above another feature (unless specified otherwise or clear from context) may instead be below, and vice versa; and similarly, features described as being to the left of another feature else may instead be to the right, and vice versa. As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Like reference numerals refer to like elements throughout. To the extent that terms "includes," "including," "has," "contains," and variants thereof are used herein, such terms are intended to be inclusive in a manner similar to the term "comprises" as an open transition word without precluding any additional or other elements.

Example implementations of the subject disclosure relate generally to the use of a classifier that incorporates a recurrent neural network (such as a recurrent neural network made up of one or more long short-term memory (LSTM) cells, for example) to recognize temporal or spatial characteristics associated with a target in SAR data without resorting to techniques that incur the significant computational load needed to generate one or more SAR images. Through the use of such a classifier in connection with the other aspects described herein, some example implementations of the subject disclosure provide for real-time or near-real time identification of targets in resource-constrained contexts.

Synthetic aperture radar (SAR) systems are typically able to provide high-resolution sensing in weather-independent and sunlight-independent environments. Consequently, SAR systems are widely used in numerous applications, including but not limited to geographical survey, climate research, environmental monitoring, navigation, and automatic target recognition (ATR). Unprocessed, or "raw" SAR data is made up of reflected radio frequencies (RF) from objects in the relevant scene. In conventional uses of SAR systems, such as those listed above, the raw SAR data (which may be referred to as RF phase history data) must first be converted into SAR images via an image formation process. Image formation from raw SAR data requires significant computational resources. The computational intensity required in the SAR image formation process is often incompatible with situations that require real-time or near real-time information, such as real-time navigation or real-time ATR, for example. The computational intensity of the image formation process often further limits the ability to effectively use SAR data in contexts involving computing platforms with limited computing resources, such as those that can be present on unmanned air vehicles (UAVs), robots, or other contexts involving low size, weight, and power (SWAP) requirements, for example.

Example implementations of the subject disclosure address these and other technical challenges.

Figure 1:
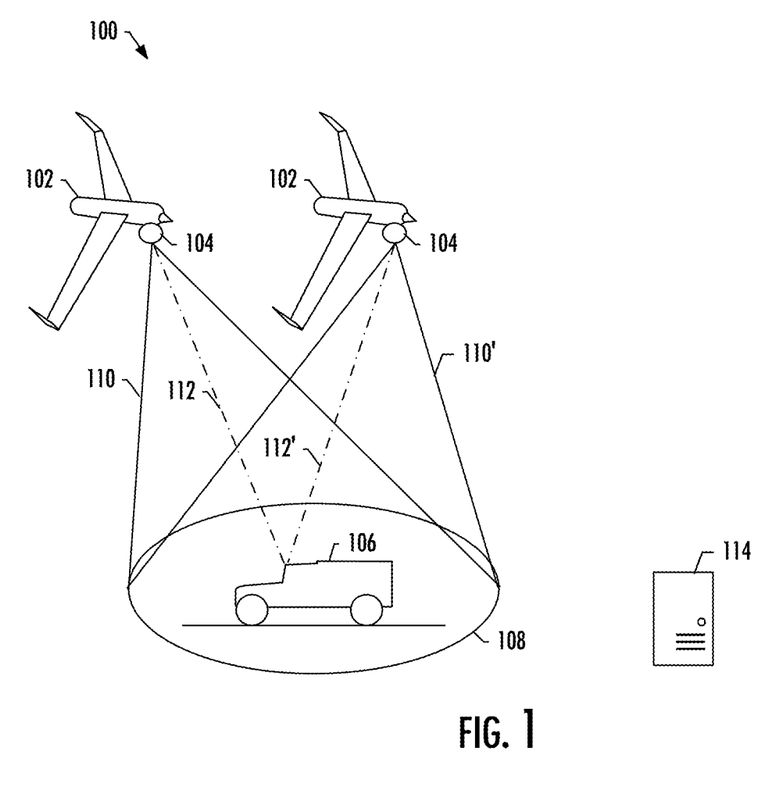
FIG. 1 illustrates an example system environment involving a SAR-based radar system for target identification which may be used in connection with example implementations of the subject disclosure.

FIG. 1 illustrates an example environment 100 involving a SAR-based radar system 104 for target identification in which example implementations of the subject disclosure can be useful. As depicted in FIG. 1, the SAR-based radar system 104 is mounted on a moving vehicle, depicted as UAV 102, and is implemented as a spotlight mode SAR-based target recognition system. However, it will be appreciated that other SAR-based modes or approaches, such as a strip-map mode SAR, can be used, and the SAR-based radar system can be incorporated into other vehicles, fixed structures, or as a stand-alone system, for example, in some example implementations of the subject disclosure. In the example environment 100 depicted in FIG. 1, the SAR-based radar system 104 is used to transmit electromagnetic waves 110 and 110' onto the scene 108, which includes a target 106. As shown in FIG. 1, the UAV 102 transmits electromagnetic waves 110 onto scene 108 when the UAV 102 is in one position on its flightpath, and electromagnetic waves 110' when the UAV 102 is in another position on its flight path. As UAV 102 continues on its flight path over scene 108, electromagnetic waves 110 and 110' are sequentially transmitted from the SAR-based radar system 104 and the backscattered waves, shown in FIG. 1 as RF phase history 112 and 112', are collected by the SAR-based radar system 104 for target identification. Consecutive time intervals of wave transmission and reception are used to acquire the RF phase history data 112-112' of the scene 108 (and the target 106) as the UAV 102 changes position along its flight path. As such, the combination of received backscattered waves allows for the construction of an aperture that is longer than the relevant physical aperture length. As shown in FIG. 1, example environment 100 also includes computing device 114, which is configured to interact with the SAR-based radar system 104 to acquire the RF phase history data 112-112' and perform one or more operations on the acquired data to identify one or more targets, such as target 106 in the data. It will be appreciated that, in some example implementations, computing device 114 can perform any of the methods and/or portions of methods described and otherwise disclosed herein.

Figure 2:
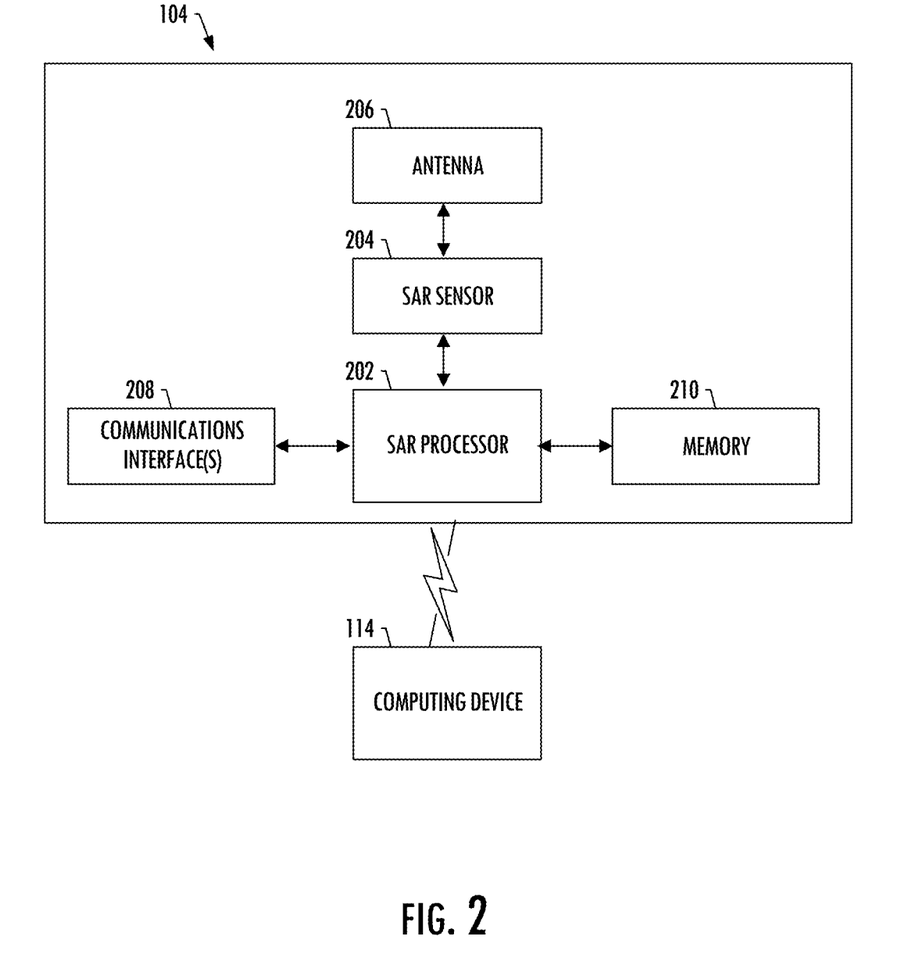
FIG. 2 illustrates a block diagram of an example SAR radar system which may be used in connection with example implementations of the subject disclosure.

FIG. 2 illustrates a block diagram of an example SAR radar system which can be used in connection with example implementations of the subject disclosure. In some situations, radar system 104 is used to capture SAR data, such as RE frequency phase history data 112-112 in the form of RF pulses reflected from an object, such as target 106 in scene 108, for example. As shown in FIG. 2, SAR radar system 104 includes an SAR processor 202, an SAR sensor 204, and an antenna 206. It will be appreciated that radar system 104 represents any type of SAR-based radar system that is configured to transmit and receive electromagnetic radiation to generate and provide SAR data, including RF phase history data, such as data 112-112' depicted in FIG. 1, for example. In some instances, the SAR processor 202, SAR sensor 204, and antenna 206 work together to transmit and receive radar energy pulses in the one or more frequency ranges from approximately one gigahertz to sixteen gigahertz. However, other frequency ranges are possible, including frequencies less than one gigahertz and more than sixteen gigahertz. While radar system 104 is depicted in FIG. 1 as being affixed to or incorporated into UAV 102, it will be appreciated that radar system 104 or other similar systems can be incorporated into or mounted on any of a number of platforms, including but not limited to various types of unmanned flying vehicles, manned flying vehicles, manned and unmanned ground-based vehicles, or stationary platforms, for example.

SAR Processor 202 can include, for example, a microprocessor, a single-core processor, a multi-core processor, a microcontroller, an application-specific integrated circuit (ASIC), a logic device (such as a programmable logic device configured to perform processing operations, for example) a digital signal processing device (DSP), one or more memories for storing executable instructions (such as software, firmware, or other instructions, for example) or any other appropriate combination of processing device(s) and memory to execute instructions to perform the various operations necessary to implement a SAR-based radar system. As shown in FIG. 2, SAR processor 202 is configured to interface with or otherwise communicate with SAR sensor 204, memory 210, and communication interface 208.

Instructions and other information necessary to implement a SAR-based radar system can be stored in memory 210 in a non-transitory manner on a machine-readable medium, such as on computer memory, hard drive, compact disc, a digital video disc, or a flash memory, for example, to be executed by the SAR processor 202. The memory 210 can also be configured to store the RF phase history data and any other SAR data collected by the radar system 104. In some example implementations, one or more non-volatile or volatile memory devices, such as RAM (random access memory), ROM (read-only memory), EEPROM (electrically-erasable read-only memory), flash memory, or other types of memory, are used to store the RE phase history data.

In some example implementations of radar system 104, SAR sensor 204 is used to transmit electromagnetic waves (such an in the form of RF pulse energy, for example) and receive backscattered waves (such as in the form of RE phase history data 112-112' of the target 106 in scene 108, for example). In some such example implementations, SAR sensor 204 includes a radar transmitter to produce radar pulses that are provided to antenna 206 and radiated in space towards scene 108 as electromagnetic waves. SAR sensor 204 also includes a radar receiver to receive backscattered waves in the form of RE phase history data from antenna 206. This RE phase history data can be stored in the memory 210 and/or directed to the communication interface 208 for transmission to another system, such as the computing device 114, which is configured to communicate with the radar system 104 to receive the RF phase history data and perform one or more operations (including but not limited to the methods and portions of methods disclosed herein) with the RE phase history data to detect a target.

In some example implementations, antenna 206 is configured to both transmit electromagnetic waves and receive backscattered waves. In some such example implementations, the antenna 206 can take the form of a parabolic antenna, a phased array antenna, or any other antenna suitable for use in an SAR-based radar system.

In some example implementations, communication interface 208 of radar system 104 is configured as one or more of a wired or wireless communication bus to facilitate communication amongst the various portions of the radar system 104 and can further facilitate wired or wireless communication with other systems or apparatuses, including but not limited to those described herein.

Example implementations of the subject disclosure overcome the technical challenges associated with the real-time or near-real time detection of a target from SAR data by eliminating the need to create SAR images from the collected data in advance of performing manual or automatic target recognition protocols on the created SAR images. In some example implementations described in more detail herein, computationally efficient target recognition is achieve by using range profiles computed from raw SAR data in the form of RF phase history data as features to represent one or more targets. In some such example implementations, the range profiles of the SAR data determined by performing one-dimensional fast Fourier transformations (FFT) of the RF phase history, data, which can be efficiently performed with one or more processors integrated with an SAR radar system or an SAR sensor therein. The range profiles can then be spliced into segments, such as two-dimensional sequence segments, for more efficient processing. In some such example implementations, an LSTM neural network (or other recurrent neural network) is applied to learn the spatial-temporal signatures of targets for automatic target recognition, and the LSTM neural network is used to identify sequence segments associated with a target, and thereby identify one or more targets.

Some example implementations of the subject disclosure are advantageous in contexts where SAR data is collected by a UAV or other vehicle subject to low size, weight, and power requirements, and the real-time or near-real time detection of a target in a given scene is valuable. As such, some of the example implementations described herein use language that can reference particular aspects of a UAV or other vehicle-based system. However, it should be appreciated that example implementations of the subject disclosure are not necessarily limited to such contexts, and instead can be advantageous in any of a number of situations or contexts involving SAR data and the computationally-efficient detection of a target in that data.

Figure 3:
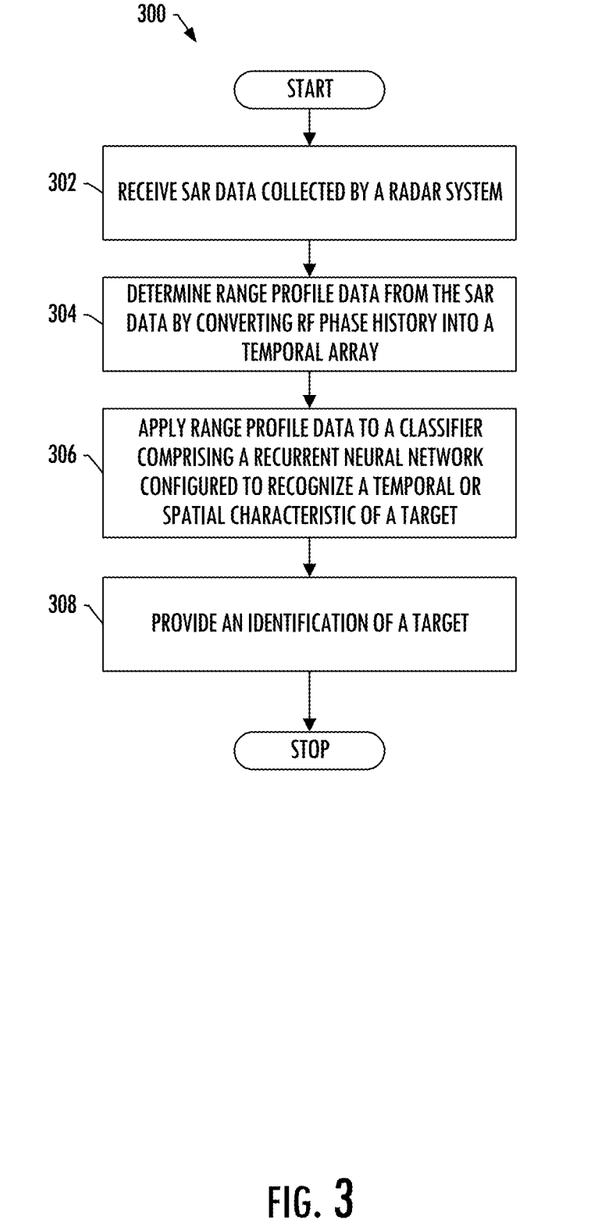
FIG. 3 illustrates a method by which a target may be identified, according to some example implementations of the subject disclosure.

FIG. 3 is a flowchart illustrating a method 300 by which a target can be identified, according to some example implementations of the subject disclosure. As shown at block 302, the method 300 includes receiving SAR data collected by a radar system. Some example implementations of block 302 include receiving SAR data collected by a radar system, wherein the SAR data comprises RF phase history data associated with reflected RF pulses from at least one object in a scene, wherein the SAR data excludes an SAR image. The SAR data can be received from any system capable of capturing, generating, or transmitting SAR data for processing, including but not limited to radar system 104 or the like. The SAR data can be spotlight mode SAR data, strip map SAR data, or SAR data from any other source or approach. As discussed above, part of the computational efficiency achieved by example implementations of the subject disclosure is derived from avoiding the need to create or use an SAR image. As such, in example implementations of block 302, the received SAR data need not include any SAR image. Instead, one or more targets can be efficiently detected using aspects of the subject disclosure from received RF phase history data associated with reflected RF pulses, sometimes referred to as "raw" SAR data.

As shown at block 304, the method 300 also includes determining range profile data from the SAR data by converting RF phase history data into a temporal array. Some example implementations of block 302 include determining range profile data from the SAR data by converting the RF phase history data associated with the reflected RF pulses into a temporal array structured to represent detected ranges of the at least one object at a plurality of time steps. In some such example implementations, converting the RF phase history data associated with the reflected RE pulses into the temporal array comprises applying a one-dimensional fast Fourier transform (FFT) to the RF pulses of the RF phase history data to generate a two-dimensional range profile array.

The received RF phase history data reflects received RF pulses that carry the relevant range information of the scene. Consequently, some example implementations of block 304 contemplate building a two-dimensional range profile data with one dimension representing range bins and the other dimension representing time steps. One approach to building such a two-dimensional range profile data involves applying a one-dimensional FFT in the radar pulse domain.

An example implementation of such an approach can be expressed mathematically, where X(i, j) is a two-dimensional RF phase history array that represents sample RF history data. In such an array, each column represents the sampled radar pulse returns at a specific time sample. In such an implementation, a radar pulse vector PO) that is extracted from a column vector of X(i, j) can be expressed in Equation 1 as:

$$P(j)=X(:,j)$$

In some such example implementations, a window function, such as a Hanning or Hamming window, for example, is applied to the pulse vectors to reduce the boundary effect associated with a Fourier transformation. A windowed pulse vector $P_w(j)$ can be expressed and computed in Equation 2 as follows, where w(j) is a window vector:

$$P_w(j)=P(j)*w(j)$$

In some example implementations, a range profile vector RP(n) can be expressed and calculated by taking the Fourier Transform of the given pulse vector, as set out in Equation 3 below:

$$RP(n) = \sum_{k=0}^{N-1} P_w(k)e^{-j\frac{2\pi nk}{N}}$$

It will be appreciated that in Equation 3, the constant N is the number of sampling frequencies. After all of the column vectors in the two-dimensional RF phase history array X(i,j) are processed with Equations 1, 2, and 3, the result is a two-dimensional range profile of input X(i,j)).

As shown at block 306, the method 300 also includes applying range profile data to a classifier comprising a recurrent neural network configured to recognize a temporal or spatial characteristic of a target. Some example implementations of block 306 include applying the range profile data to a classifier comprising a recurrent neural network configured to recognize, within the range profile data, a temporal or spatial characteristic associated with a target. As described above, RF phase history data associated with reflected RF pulses can be expressed as a two-dimensional array. The range profile of RF phase history data is also a two-dimensional array, one dimension for range and the other dimension for time. Different targets possess different temporal correlation patterns in the received reflected RF pulse information captured in the time dimension of the range profile array. These temporal correlations can constitute a signature that allows for different targets to be identified. As such, in some example implementations, recognizing such temporal correlations (in a time domain), or spatial correlations (in a range domain), in the range profile of the received RF phase history data can allow for the efficient detection of a target without resorting to the generation of an SAR image. Classifier models that incorporate a recurrent neural network, such as the LSTM cells and network described herein in connection with FIG. 4 and FIG. 5, for example are often well-suited to learn and recognize such temporal correlations and spatial correlations.

In some example implementations of block 306, applying the range profile data to the classifier comprises extracting segments from the range profile data, wherein each segment comprises a portion of the range profile data at a sequential subset of the plurality of time steps and providing each segment serially as input to the classifier, wherein the classifier is further configured to recognize, within each segment, the temporal or spatial characteristic associated with the target. In some such example implementations of block 306, the sequential subset of the plurality of time steps for each of the segments is non-overlapping with any other sequential subset for the plurality of time steps. In other example implementations of block 306, the sequential subset of the plurality of time steps for a first of the segments includes a time step that is included in the sequential subset of the plurality of time steps of a second segment.

The extraction of segments from the range profile data can, in some example implementations, allow for the use of a classifier with a smaller neural network. As described herein, the range profile data can be structured as a two-dimensional array, where each column represents detected objects at different time steps, and the temporal correlation of SAR-derived range profiles is a potentially important signature that allows for the identification of different targets. However, in example implementations where the range profile data covers a relatively long time period, applying the full range profile data into a neural network requires a neural network of a size that can impede the ability of the neural network to be efficiently developed and deployed, particularly in resource-constrained contexts. Consequently, some example implementations allow for the use of smaller neural networks by splitting the range profile data into multiple, shorter segments. One approach to extracting such segments involves the application of a sliding window approach. A two-dimensional range profile can be expressed as RP(m, t), where m in an index for range (or range bins) and t represents time. In some example implementations, the it/i sequence segment can be expressed and calculated as set out in Equation 4 below:

$$S_i(:,t)=\{RP(:,t):(i-1)*ts \leq t \leq i*ts\}$$

In Equation 4, the constant ts is the time length of the given sequence segment. It will be appreciated that the segments extracted through the operation of Equation 4 do not overlap with respect to time, which typically results in a lower overall number of segments for a given time interval. However, it is also possible to sample sequence segments that overlap at least partially with respect to time, which, in some example implementations, will avoid the potential loss of a temporal correlation between two adjacent sequence segments. Overlapping sequence segments with an overlap of $t_m$ can be expressed and calculated as set out in Equation 5 below:

$$S_i(:,t)=\{RP(:,t):(i-1)t_{in} \leq t \leq (i-1)t_{in}+ts\}$$

Regardless of whether the sequence segments overlap or not, some example implementations of block 306 include the recurrent neural network comprising long short-term memory (LSTM) cells configured to identify a spatial-temporal correlation pattern within the range profile sequence segments.

As shown at block 308, the method 300 also includes providing an identification of a target. Some example implementations of block 308 include provide an identification of a target associated with the temporal characteristic or spatial characteristic discussed above respect to block 306. As discussed herein, example implementations of the subject disclosure allow for the computationally efficient detection of target by detecting temporal correlations or spatial correlations in the RF phase history data that are associated with a given target. Classifiers that incorporate recurrent neural networks are often well suited to learning the particular temporal and spatial characteristics that can be present in input data sequences derived from RF phase history data, recognizing target-related correlations or other characteristics, and providing an identification of a likely target. In some example implementations, the use of LSTM cells to build a neural network can be advantageous. It will be appreciated that the computational efficiency achieved by example implementations of method 300, including but not limited to those that incorporate LSTM cells and related neural networks, can result in implementations of method 300 wherein the radar system and the classifier are co-located on a vehicle. For example, with reference to FIG. 1, the classifier can be incorporated into circuitry on the UAV 102 in a situation where the computational efficiency achieved in the implementation allows for the classifier to be added to the UAV 102 without violating any relevant specification of the UAV 102. In situations where the classifier and the radar system are co-located, it can be possible to achieve real-time or near real-time target identification in situations and contexts where a response to the target identification can be made directly from the platform containing the radar system and the classifier.

Figure 4:
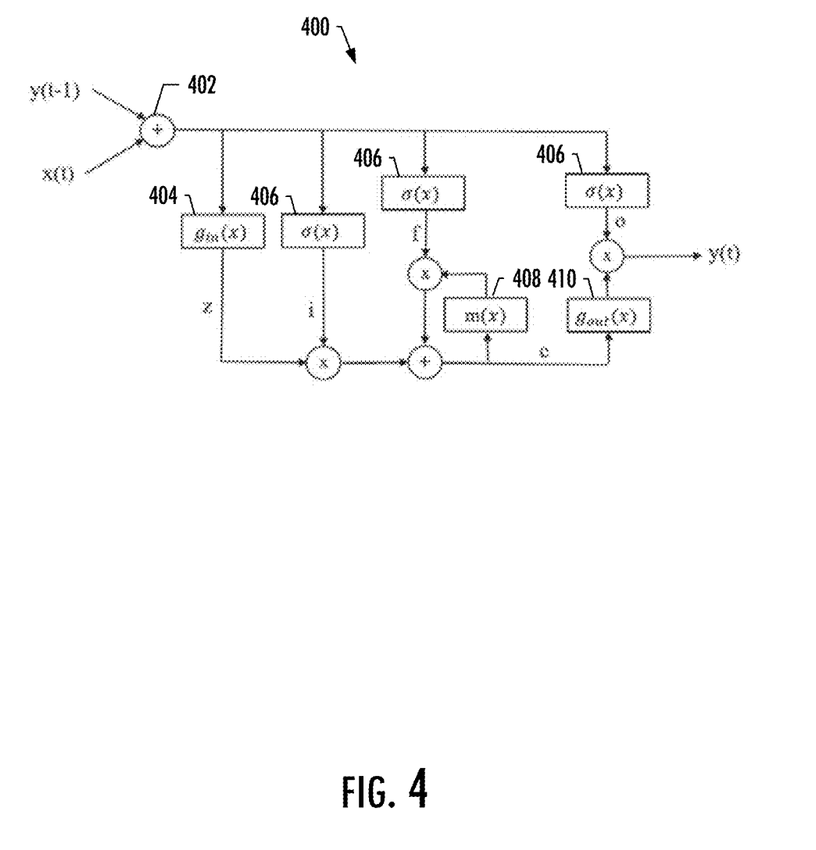
FIG. 4 illustrates an example block diagram of a LSTM cell which may be used in connection with example implementations of the subject disclosure.

FIG. 4 illustrates an example block diagram of a computing structure of an LSTM cell 400 that can be used in connection with example implementations of the subject disclosure. The LSTM cell 400 depicted in FIG. 4 in made up of four input passes (with input applied at input 402), one memory cell 408, and one output pass, with each input pass and output pass governed by a gate function. As shown in FIG. 4, the input gate function 404 is expressed as $g_{in}(x)$ and the output gate function 410 is expressed as $g_{out}(x)$. In some example implementations, both the input gate function 404 and the output gate function 410 can be expressed as hyperbolic tangent functions set out in Equation 6 as:

$$g(x)=\tan h(x)$$

Information control gate functions 406 are can be implemented as logistic sigmoid functions $\sigma(x)$, which can be expressed and calculated as set out in Equation 7:

$$\sigma(x) = \frac{1}{1+e^{-x}}$$

The memory cell function m(x) associated with memory cell 408 can be defined and expressed as set out in Equation 8:

$$m(x(t))=x(t-1)$$

As noted above, some example implementations of an LSTM cell involve four input passes. In such example implementations, the input passes are associated with four input weights ($W_z$, $W_i$, $W_f$, $W_o$), four recurrent weights ($R_z$, $R_i$, $R_f$, $R_o$), and four bias weights ($b_z$, $b_i$, $b_f$, $b_o$). It will be appreciated that all of the weights can be learned by the LSTM cell through a supervised learning process involving a backpropagation through time algorithm, in which the LSTM cell is unfolded into a multilayer perceptron in terms of its temporal operations, and a gradient-decent based backpropagation algorithm can be applied to the unfolded multilayer perceptron for learning weights in a given network. Regardless of the training approach used with an LSTM cell, it will be appreciated that a network made up of LSTM cells can be capable of learning complex long-term correlations and relationships presented in a given input sequence and can be robust to the vanishing gradient issues associated with the training of multilayer neural networks.

In accordance with the determined input, recurrent, and bias weights, the output of LSTM can be calculated in accordance with Equations 9-14, where the symbol * represents a pointwise multiplication of two vectors.

The value in variable z of LSTM cell 400 can be calculated and expressed as set out in Equation 9 below:

$$z(t)=g_{in}(W_z x(t)+R_z y(t-1)+b_z)$$

The value in variable i of LSTM cell 400 can be calculated and expressed as set out in Equation 10 below:

$$i(t)=\sigma(W_i x(t)+R_i y(t-1)+b_i)$$

The value in variable f of LSTM cell 400 can be calculated and expressed as set out in Equation 11 below:

$$f(t)=\sigma(W_f x(t)+R_f y(t-1)+b_f)$$

The value in variable c of LSTM cell 400 can be calculated and expressed as set out in Equation 12 below:

$$c(t)=z(t)*i(t)+c(t-1)*f(t)$$

The value in variable o of LSTM cell 400 can be calculated and expressed as set out in Equation 13 below:

$$o(t)=\sigma(W_o x(t)+R_o y(t-1)+b_o)$$

The output y(t) of LSTM cell 400 can then be calculated and expressed as set out in Equation 14 below:

$$y(t)=g_{out}(c(t))*o(t)$$

Figure 5:
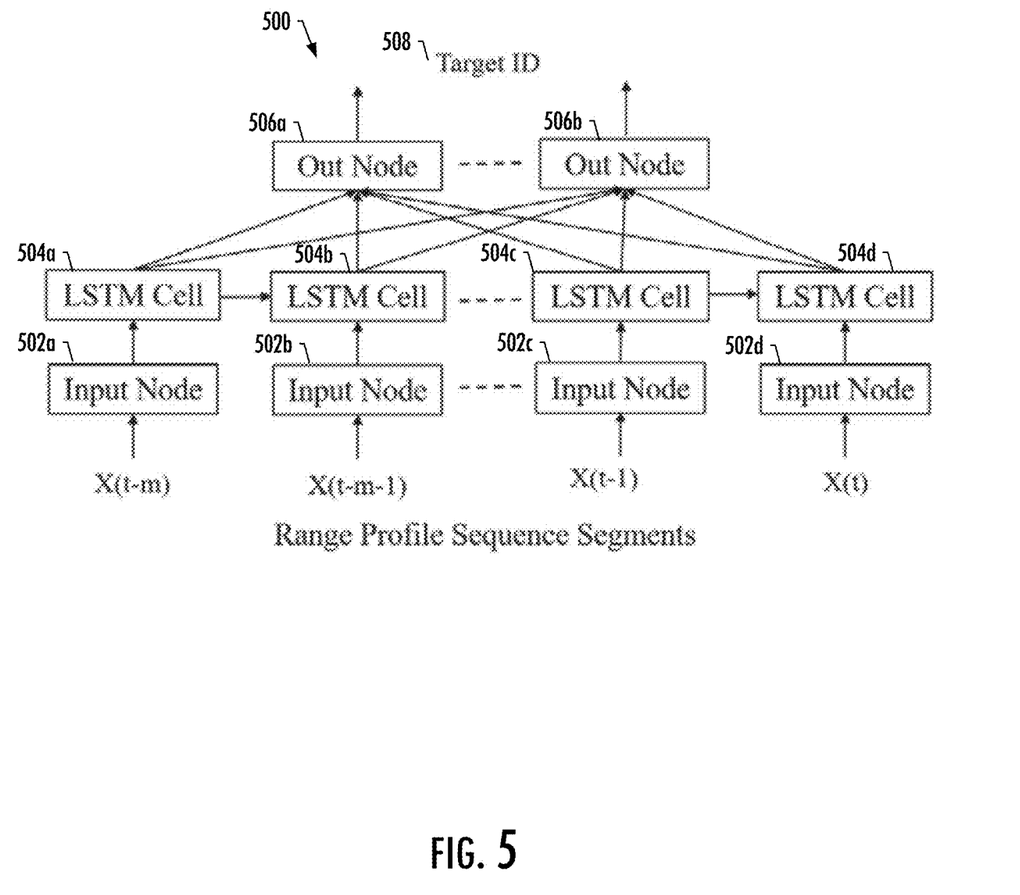
FIG. 5 illustrates an example classifier incorporating LSTM cells according to example implementations of the subject disclosure.

It will be appreciated that the single LSTM cell 400 presented in FIG. 4 and described above can be combined with other LSTM cells to create a recurrent neural network that can be used in connection with example implementations of block 306 and other example implementations of the subject disclosure. In particular, an LSTM cell can be used as a working cell for constructing more complex neural networks for a range of applications. FIG. 5 illustrates an example classifier 500 incorporating LSTM cells 504a, 504b, 504c, and 504d, according to example implementations of the subject disclosure. In the example classifier 500, each extracted segment from the range profile data (expressed in FIG. 5 as X(t), X(t−1), X(t−m−1), and X(t−m)) is applied to a respective input node 502a, 502b, 502c, and 502d, which passes the extracted segment as input to their respective LSTM cells 504a-504d. In the example classifier 500, the input nodes 502a-502d are configured to pass input vectors, including but not limited to one-dimensional input vectors to their respective LSTM cells 504a-504d.

In the arrangement presented in FIG. 5, the LSTM cells 504a-504d are used to learn and recognize the spatial-temporal correlations and/or other relationships present in the input sequence, and the out nodes 506a-506b are used to compute the probability of a possible target identification. It will be appreciated that the number of out-nodes 506a-506b is, in some example implementations, equal to the number of possible targets on which the LSTM nodes 504a-504d have been trained, and each out node 506a-506b is fully connected to all of the LSTM cells 504a-504d. In some example implementations, a softmax function is used in the out nodes, such that y(j) is the output of the jth out node, and the softmax function is calculated and expressed as set out in Equation 15 below:

$$P(y=j\,|\,x(t))=\frac{e^{y(j)}}{\sum_{n=1}^{N}e^{y(n)}}$$

In such an example implementation, the target identification 508 can be calculated and expressed as set out in Equation 16 below:

$$TargetID=\arg\max_{i\in[1,N]}\{P(y=i\,|\,x(t))\}$$

It will be appreciated that other approaches to building a recurrent neural network incorporating LSTM cells, or other topologies, can be used in connection with example implementations of the subject disclosure.

Figure 6A:
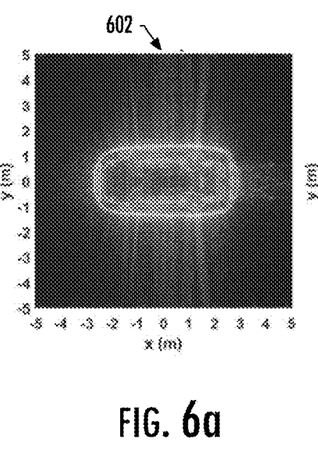
FIGS. 6A, 6B, and 6C illustrate SAR images formed from raw SAR data in accordance with one approach to target identification.
Figure 6B:
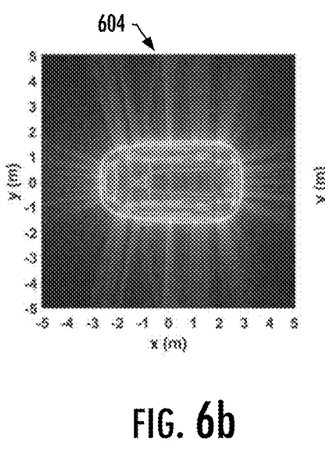
Figure 6C:
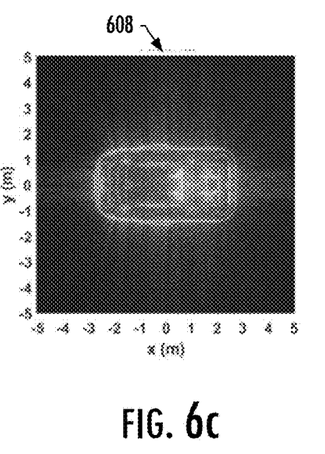

FIGS. 6a, 6b, and 6c illustrate SAR images 602, 604, and 606 formed from raw SAR data in accordance with one approach to target identification. The images 602, 604, and 606 were formed with a set of simulated X-band SAR phase history information for three separate civilian vehicles, image 602 depicting a sedan, image 604 depicting a passenger van, and image 606 depicting a pickup truck. Each of the images 602, 604, and 606 was created through the capture of RF phase history data at four elevation angles (30, 40, 50, and 60 degrees), with each elevation angle ultimately producing phase history data as a 2D complex array with a size of 512 frequencies×5760 time steps. It will be appreciated that while images 602, 604, and 606 provide a degree of human-perceptible detail, the computational resources necessary to create such images and subsequently perform a target recognition operation would preclude the possibility of real-time or near real-time target recognition in many contexts.

Figure 7A:
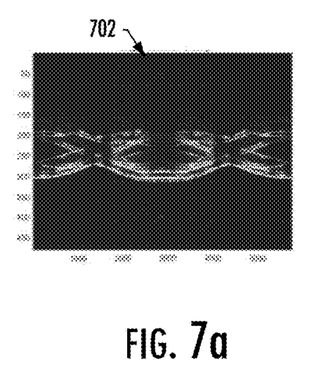
FIGS. 7A, 7B, and 7C illustrate are flowcharts illustrating samples of range profile data derived from the same raw SAR data used to form the images in FIGS. 6A, 6B, and 6C, according to example implementations of the subject disclosure.
Figure 7B:
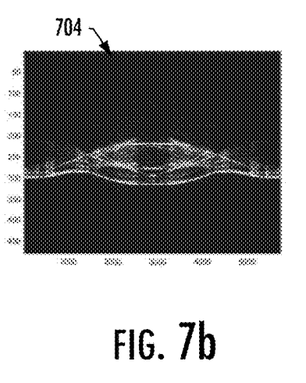
Figure 7C:
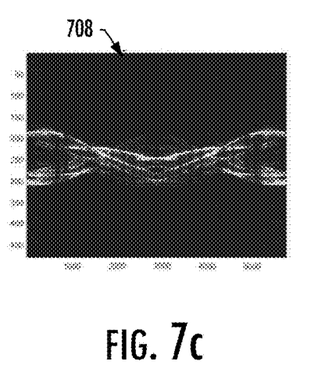

FIGS. 7a, 7b, and 7c provide graphical depictions 702, 704, and 704 of samples of range profile data derived from the same raw SAR data used to form the images in FIGS. 6a, 6b, and 6c, according to example implementations of the subject disclosure. Instead of forming the images presented in FIGS. 6a-6c, a hamming window of size 512 was used to modify the same raw SAR data, and a one-dimensional FFT was applied in the RF pulse domain to obtain range profile data from each phase history associated with each of the three civilian vehicles. Sequence segments covering 20 degrees of azimuth angle (where the original range profiles cover 360 degrees of azimuth angle) were extracted from the originally derived range profiles with a sampling interval of 5 degrees of azimuth angle, resulting in overlapping sequence segments. In the example implementation used in connection with FIGS. 7a-7c, a total of 272 sequence segments for each vehicle were extracted, with each sequence segment having a size of 20 features (range bins) by 80 time steps. In order to test an example implementation of an LSTM-based classifier using 80 LSTM cells and 20 internal states for each LSTM cell, 516 sequence segments were used to train the classifier, and 300 sequence segments were used as test data. Under test, the trained classifier classified sequence segments at a rate of less than 24 milliseconds per segment, which is fast enough for many applications requiring real-time or near real-time target recognition, while maintaining a high degree of accuracy.

Figure 8:
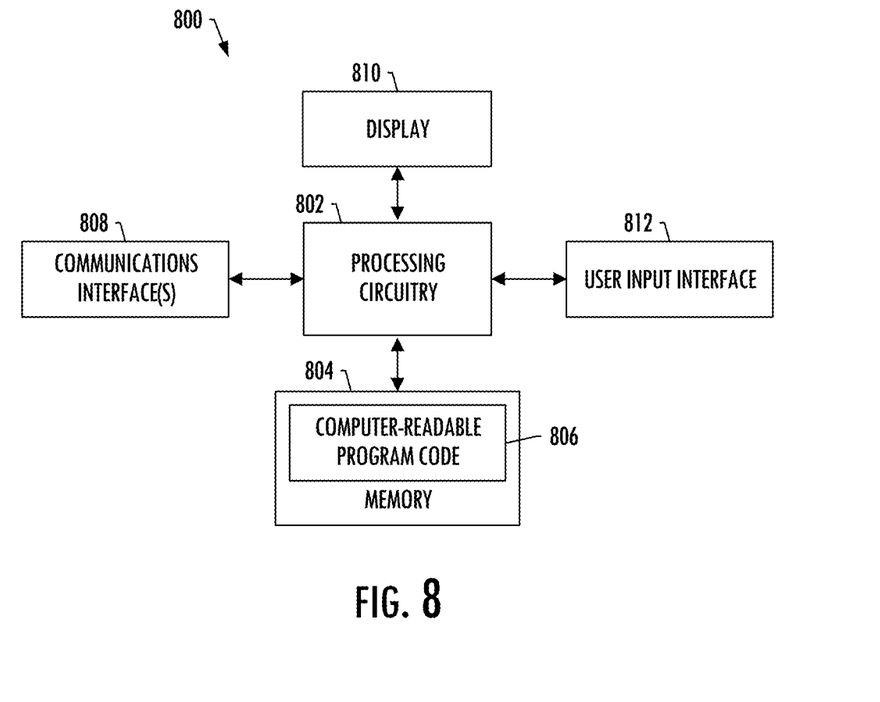
FIG. 8 illustrates an apparatus according to some example implementations of the subject disclosure.

FIG. 8 illustrates an apparatus 800 according to some example implementations of the subject disclosure. As noted herein, some example implementations of the subject disclosure involve the use of an apparatus, such as computing device 114, to perform one or more of the methods or portions thereof disclosed herein. Generally, an apparatus of example implementations of the subject disclosure can comprise, include or be embodied in one or more fixed or portable electronic devices. Examples of suitable electronic devices include computers such as desktop computers, server computers, portable computers (e.g., laptop computer, tablet computer), mobile phones (e.g., cell phone, smartphone), wearable computers (e.g., smartwatch), or the like. The apparatus can include one or more of each of a number of components such as, for example, processing circuitry 802 (e.g., processor unit) connected to a memory 804 (e.g., storage device). It will be appreciated that computing device 114 can take the form of any aspect of the apparatus disclosed herein.

The processing circuitry 802 can be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which can be packaged as an integrated circuit or multiple interconnected integrated circuits (an integrated circuit at times more commonly referred to as a "chip"). The processing circuitry can be configured to execute computer programs, which can be stored onboard the processing circuitry or otherwise stored in the memory 804 (of the same or another apparatus).

The processing circuitry 802 can be a number of processors, a multi-core processor or some other type of processor, depending on the particular implementation. Further, the processing circuitry can be implemented using a number of heterogeneous processor systems in which a main processor is present with one or more secondary processors on a single chip. As another illustrative example, the processing circuitry can be a symmetric multi-processor system containing multiple processors of the same type. In yet another example, the processing circuitry can be embodied as or otherwise include one or more ASICs, FPGAs or the like. Thus, although the processing circuitry can be capable of executing a computer program to perform one or more functions, the processing circuitry of various examples can be capable of performing one or more functions without the aid of a computer program. In either instance, the processing circuitry can be appropriately programmed to perform functions or operations according to example implementations of the subject disclosure.

The memory 804 is generally any piece of computer hardware that is capable of storing information such as, for example, data, computer programs (e.g., computer-readable program code 806) and/or other suitable information either on a temporary basis and/or a permanent basis. The memory can include volatile and/or non-volatile memory, and can be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks can include compact disk read only memory (CD-ROM), compact disk read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage in medium or computer-readable transmission medium.

In addition to the memory 804, the processing circuitry 802 can also be connected to one or more interfaces for displaying, transmitting and/or receiving information. The interfaces can include a communications interface 808 (e.g., communications unit) and/or one or more user interfaces. The communications interface can be configured to transmit and/or receive information, such as to and/or from other apparatus(es), network(s) or the like. The communications interface can be configured to transmit and/or receive information by physical (wired) and/or wireless communications links. Examples of suitable communication interfaces include a network interface controller (NIC), wireless NIC (WNIC) or the like.

The user interfaces can include a display 810 and/or one or more user input interfaces 812 (e.g., input/output unit). The display can be configured to present or otherwise display information to a user, suitable examples of which include a liquid crystal display (LCD), light-emitting diode display (LED), plasma display panel (PDP) or the like. The user input interfaces can be wired or wireless, and can be configured to receive information from a user into the apparatus, such as for processing; storage and/or display. Suitable examples of user input interfaces include a microphone, image or video capture device, keyboard or keypad, joystick, touch-sensitive surface (separate from or integrated into a touchscreen), biometric sensor or the like. The user interfaces can further include one or more interfaces for communicating with peripherals such as printers, scanners or the like.

As indicated above, program code instructions can be stored in memory, and executed by processing circuitry that is thereby programmed, to implement functions of the systems, subsystems, tools and their respective elements described herein. As will be appreciated, any suitable program code instructions can be loaded onto a computer or other programmable apparatus from a computer-readable storage medium to produce a particular machine, such that the particular machine becomes a means for implementing the functions specified herein. These program code instructions can also be stored in a computer-readable storage medium that can direct a computer, a processing circuitry or other programmable apparatus to function in a particular manner to thereby generate a particular machine or particular article of manufacture. The instructions stored in the computer-readable storage medium can produce an article of manufacture, where the article of manufacture becomes a means for implementing functions described herein. The program code instructions can be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions can be performed sequentially such that one instruction is retrieved, loaded and executed at a time. In some example implementations, retrieval, loading and/or execution can be performed in parallel such that multiple instructions are retrieved, loaded, and/or executed together. Execution of the program code instructions can produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 800 can include a processing circuitry 802 and a computer-readable storage medium or memory 804 coupled to the processing circuitry, where the processing circuitry is configured to execute computer-readable program code 806 stored in the memory. It will also be understood that one or more functions, and combinations of functions, can be implemented by special purpose hardware-based computer systems and/or processing circuitry s which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions can be provided by alternative implementations without departing from the scope of the appended claims, in this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method, comprising:
receiving synthetic aperture radar (SAR) data collected by a radar system, wherein the SAR data comprises radio frequency (RF) phase history data associated with reflected RE pukes from at least one object in a scene, and wherein the SAR data excludes an SAR image;
determining range profile data from the SAR data by converting the RF phase history data associated with the reflected RF pulses into a temporal range-profile array structured to represent detected ranges of the at least one object at a plurality of time steps;
applying the range profile data to a classifier comprising a recurrent neural network configured to recognize, within the range profile data, a temporal characteristic or a spatial characteristic associated with a target; and
providing an identification of a target associated with the temporal characteristic or the spatial characteristic.

2. The method of claim 1, wherein applying the range profile data to the classifier comprises extracting segments from the range profile data, wherein each segment comprises a portion of the range profile data at a sequential subset of the plurality of time steps and providing each segment serially as input to the classifier, and wherein the classifier is further configured to recognize, within each segment, the temporal characteristic or the spatial characteristic associated with the target.

3. The method of claim 2, wherein the sequential subset of the plurality of time steps for each of the segments is non-overlapping with any other sequential subset of the plurality of time steps.

4. The method of claim 2, wherein the sequential subset of the plurality of time steps for a first of the segments includes a time step that is included in the sequential subset of the plurality of time steps of a second segment.

5. The method of claim 2, wherein the recurrent neural network comprises long short-term memory (LSTM) cells configured to identify a spatial-temporal correlation pattern within the range profile sequence segments.

6. The method of claim 1, wherein converting the RF phase history data associated with the reflected RF pulses into the temporal range-profile array comprises applying a one-dimensional fast Fourier transform in the RF pulse domain to the RF phase history data to generate a two-dimensional range-profile array.

7. The method of claim 1, wherein the radar system and the classifier are co-located on a vehicle.

8. An apparatus, comprising processing circuitry and a memory storing executable instructions that, in response to execution by the processing circuitry, cause the apparatus to at least:
receive synthetic aperture radar (SAR) data collected by a radar system, wherein the SAR data comprises radio frequency (RF) phase history data associated with reflected RF pulses from at least one object in a scene, and wherein the SAR data excludes an SAR image;
determine range profile data from the SAR data by converting the RF phase history data associated with the reflected RF pulses into a temporal range-profile array structured to represent detected ranges of the at least one object at a plurality of time steps;
apply the range profile data to a classifier comprising a recurrent neural network configured to recognize, within the range profile data, a temporal characteristic or a spatial characteristic associated with a target; and
provide an identification of a target associated with the temporal characteristic or the spatial characteristic.

9. The apparatus of claim 8, wherein the apparatus being caused to apply the range profile data to the classifier comprises being caused to extract segments from the range profile data; wherein each segment comprises a portion of the range profile data at a sequential subset of the plurality of time steps and providing each segment serially as input to the classifier, and wherein the classifier is further configured to recognize, within each segment, the temporal characteristic or the spatial characteristic associated with the target.

10. The apparatus of claim 9, wherein the sequential subset of the plurality of time steps for each of the segments is non-overlapping with any other sequential subset of the plurality of time steps.

11. The apparatus of claim 9, wherein the sequential subset of the plurality of time steps for a first of the segments includes a time step that is included in the sequential subset of the plurality of time steps of a second segment.

12. The apparatus of claim 9, wherein the recurrent neural network comprises long short-term memory (LSTM) cells configured to identify a spatial-temporal correlation pattern within the range profile sequence segments.

13. The apparatus of claim 8, wherein converting the RF phase history data associated with the reflected RF pulses into the temporal range-profile array comprises applying a one-dimensional fast Fourier transform in the RF pulse domain to the RP phase history data to generate a two-dimensional range-profile array.

14. The apparatus of claim 8, wherein the radar system and the classifier are co-located on a vehicle.

15. A computer-readable storage medium, the computer-readable storage medium being non-transitory and having computer-readable program code portions stored therein that in response to execution by a processor, cause an apparatus to perform operations comprising:
 receiving synthetic aperture radar (SAR) data from a radar system, wherein the SAR data comprises radio frequency (RF) phase history data associated with reflected RF pulses from at least one object in a scene, and wherein the SAR data excludes an SAR image;
 determining range profile data from the SAR data by converting the RF phase history data associated with the reflected RF pulses into a temporal array structured to represent detected ranges of the at least one object at a plurality of time steps;
 applying the range profile data to a classifier comprising a recurrent neural network configured to recognize, within the range profile data, a temporal characteristic or a spatial characteristic associated with a target; and
 providing an identification of a target associated with the temporal characteristic or the spatial characteristic.

16. The computer readable storage medium of claim 15, wherein the operations further comprise applying the range profile data to the classifier comprises being caused to extract segments from the range profile data, wherein each segment comprises a portion of the range profile data at a sequential subset of the plurality of time steps and providing each segment serially as input to the classifier, and wherein the classifier is further configured to recognize, within each segment, the temporal characteristic or the spatial characteristic associated with the target.

17. The computer readable storage medium of claim 16, wherein the sequential subset of the plurality of time steps for each of the segments is non-overlapping with any other sequential subset of the plurality of time steps.

18. The computer readable storage medium of claim 16, wherein the sequential subset of the plurality of time steps for a first of the segments includes a time step that is included in the sequential subset of the plurality of time steps of a second segment.

19. The computer readable storage medium of claim 16, wherein the recurrent neural network comprises long short-term memory (LSTM) cells configured to identify a spatial-temporal correlation pattern within the range profile sequence segments.

20. The computer readable storage medium of claim 15, wherein the converting the RF phase history data associated with the reflected RE pulses into the temporal array comprises applying a one-dimensional fast Fourier transform in the RF pulse domain to the RF phase history data to generate a two-dimensional range-profile array.

* * * * *

UNITED STATES PATENT AND TRADEMARK OFFICE
CERTIFICATE OF CORRECTION

PATENT NO. : 11,280,899 B2  
APPLICATION NO. : 16/804978  
DATED : March 22, 2022  
INVENTOR(S) : Qin Jiang et al.

Page 1 of 1

It is certified that error appears in the above-identified patent and that said Letters Patent is hereby corrected as shown below:

In the Claims

In Column 15, Claim 1, Line 50, "reflected RE pukes from" should read -- reflected RF pulses from --

In Column 16, Claim 9, Line 48, "profile data; wherein each" should read -- profile data, wherein each --

In Column 17, Claim 13, Line 3, "the RP phase" should read -- the RF phase --

In Column 18, Claim 20, Line 25, "reflected RE pulses" should read -- reflected RF pulses --

Signed and Sealed this  
Twenty-eighth Day of June, 2022

Katherine Kelly Vidal  
*Director of the United States Patent and Trademark Office*